United States Patent [19]
Yamakawa

[11] Patent Number: 5,493,449
[45] Date of Patent: Feb. 20, 1996

[54] IMAGERY LENS SYSTEM

[75] Inventor: Hiromitsu Yamakawa, Saitama, Japan

[73] Assignee: Fuji Photo Optical Co., Ltd., Saitama, Japan

[21] Appl. No.: 294,739

[22] Filed: Aug. 23, 1994

[30] Foreign Application Priority Data

Oct. 7, 1993 [JP] Japan .................................. 5-251525

[51] Int. Cl.$^6$ ..................................... G02B 9/36
[52] U.S. Cl. ........................................... 359/775; 359/778
[58] Field of Search ..................... 359/775, 776, 359/778

[56] References Cited

U.S. PATENT DOCUMENTS

| | | | |
|---|---|---|---|
| 2,407,347 | 9/1946 | Sachtleben | 359/775 |
| 3,619,036 | 11/1971 | Baken | 359/775 |
| 4,264,139 | 3/1981 | Maeda | 359/753 |
| 4,285,579 | 8/1981 | Yamada | 359/775 |
| 4,415,241 | 1/1983 | Shinohara | 359/788 |
| 4,781,449 | 4/1988 | Hirakawa et al. | 359/788 |
| 5,139,342 | 8/1992 | Matsuzaki | 359/775 |

FOREIGN PATENT DOCUMENTS 59-90810  3/1984  Japan .
1183614  7/1989  Japan .

*Primary Examiner*—Ali Neyzari
*Assistant Examiner*—Michael A. Papalas
*Attorney, Agent, or Firm*—Sixbey, Friedman, Leedom & Ferguson; Gerald J. Ferguson, Jr.

[57] ABSTRACT

An imagery lens system for image reading consists of first to fourth lens elements which are arranged in this order from the object side. The first and fourth lens elements respectively are double-convex lenses, and the second and third lens elements respectively are double-concave lenses. The following formulae are satisfied.

$0.35 < f1/f < 0.51$ —(1)
$0.34 < f4/f < 0.45$ —(2)
$0.11 < d7/f < 0.16$ —(3)
$0.29 < d/f < 0.41$ —(4)

wherein f represents the synthetic focal length of the overall lens system, f1 represents the focal length of the first lens element, f4 represents the focal length of the fourth lens element, d represents the axial surface separation between the object side face of the first lens element and the image side face of the fourth lens element and d7 represents the central thicknesses of the fourth lens element.

10 Claims, 5 Drawing Sheets

FIG. 2A
SPHERICAL ABERRATION
F/4.8
— e-Line
--- g-Line
-·- c-Line

FIG. 2B
ASTIGMATISM
y'=3.25
S, T

FIG. 2C
DISTORTION
y'=3.25

FIG. 3A
SPHERICAL ABERRATION
F/4.8
— e-Line
--- g-Line
-·- c-Line

FIG. 3B
ASTIGMATISM
y'=3.25
T, S

FIG. 3C
DISTORTION
y'=3.25

SPHERICAL
ABERRATION
F/4.8

— e-Line
---- g-Line
—·— c-Line

ASTIGMATISM
y'=3.25

DISTORTION
y'=3.25

SPHERICAL
ABERRATION
F/4.8

— e-Line
---- g-Line
—·— c-Line

ASTIGMATISM
y'=3.25

DISTORTION
y'=3.25

SPHERICAL
ABERRATION
F/4.8
— e-Line
--- g-Line
-·- c-Line

ASTIGMATISM
y'=3.25

DISTORTION
y'=3.25

SPHERICAL
ABERRATION
F/4.8
— e-Line
--- g-Line
-·- c-Line

ASTIGMATISM
y'=3.25

DISTORTION
y'=3.25

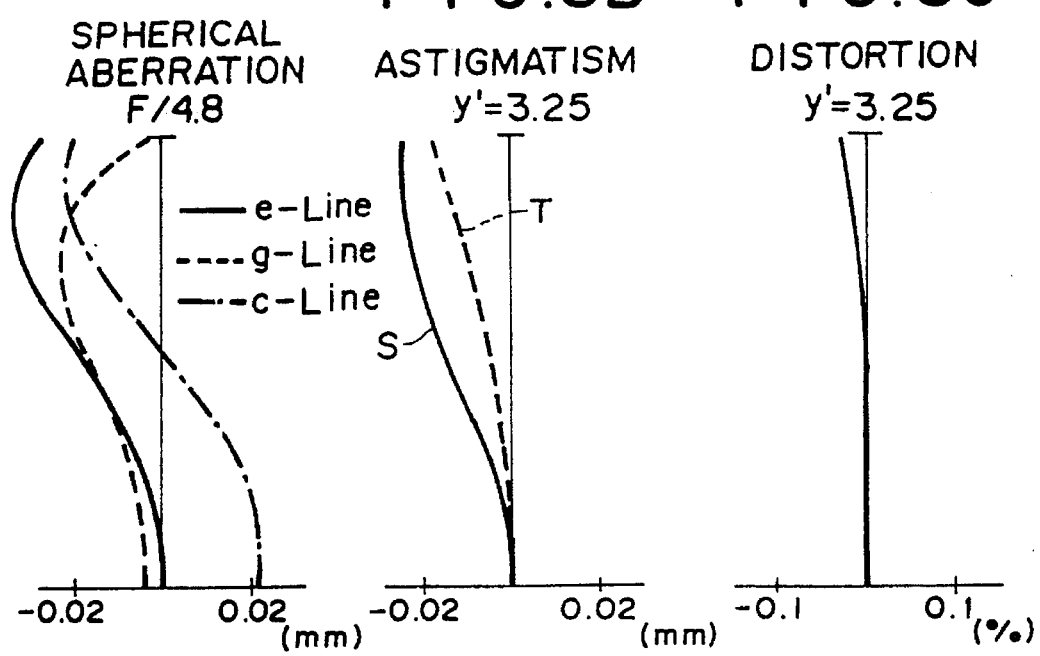

IMAGERY LENS SYSTEM

BACKGROUND OF THE INVENTION

1. Field of the Invention

This invention relates to an imagery lens system which is used in an optical system for an image reading system such as a facsimile, an image scanner or the like, and more particularly to an imagery lens system for magnifying or reducing an image to be read.

2. Description of the Prior Art

An imagery lens system which is used in an optical system for an image reading system such as a facsimile, an image scanner or the like in order to focus an image of a manuscript on an image pickup device such as a CCD on a magnified or reduced scale is required to be high in resolution, large in marginal light quantity, and small in distortion at a magnification used.

As the lens systems which satisfy such requirements, there have been provided lens systems of Gauss type, Ortho metar type and Xenotar type. See U.S. Pat. Nos. 4,264,139 and 4,415,241, Japanese Unexamined Patent Publication No. 59(1984)-90810, and the like.

The known lens systems comprises five or more lens elements, and accordingly large in size and high in cost. In order to reduce the size and the cost of the lens system, thereby reducing the size and the cost of the overall optical system, lens systems of Tesaar type comprising four lens elements have been developed as disclosed, for instance, in Japanese Unexamined Patent Publication No. 1(1989)-183614, and U.S. Pat. No. 4,781,449.

However, since the Tesaar type lens system for an image reading system having four lens elements is apt to be large in the overall length, there has been a demand for a lens system for an image reading system which is short and small in the overall size and can be manufactured at low cost.

SUMMARY OF THE INVENTION

In view of the foregoing observations and description, the primary object of the present invention is to provide an imagery lens system for an image reading system which consists of four lens elements and which is short and small in the overall size, can be manufactured at low cost and can form an image with a high quality.

The imagery lens system of the present invention consists of first to fourth lens elements which are arranged in this order from the object side, the first and fourth lens elements respectively being double-convex lenses, the second and third lens elements respectively being double-concave lenses, and satisfies the following formulae, $0.35 < f_1/f < 0.51$ —(1)

$0.34 < f_4/f < 0.45$ —(2)

$0.11 < d_7/f < 0.16$ —(3)

$0.29 < d/f < 0.41$ —(4)

wherein f represents the synthetic focal length of the overall lens system, $f_1$ represents the focal length of the first lens element, $f_4$ represents the focal length of the fourth lens element, d represents the axial surface separation between the object side face of the first lens element and the image side face of the fourth lens element and $d_7$ represents the central thicknesses of the fourth lens element.

Preferably a stop is disposed between the third and fourth lens elements.

The lens system of the present invention can be used as a reducing lens when the first to fourth lens elements are arranged from the object side in this order, and when the lens system is reversed so that the first lens element is faced toward the image side with the fourth lens element faced toward the object side, the lens system functions as a magnifying lens.

In the imagery lens system for an image reading system in accordance with the present invention, since the front side lens pair, i.e., the first and second lens elements, and a rear side lens pair, i.e., the third and fourth lens elements, both consist of a convex lens and a concave lens, and aberration generated in the front side lens element in each lens pair is corrected by the rear side lens element in each pair before it becomes large, aberrations can be efficiently corrected.

The formula (1) is for the power of the first lens element which determines the ratio $f_1/f$ of the focal length $f_1$ of the first lens element to the synthetic focal length f of the overall lens system. When the ratio $f_1/f$ is smaller than the upper limit, the angle at which the off-axis light bundle enters the lens elements behind the first lens element can be reduced and astigmatism can be suppressed. On the other hand when the ratio $f_1/f$ is larger than the lower limit, coma can be well corrected.

That is, when the ratio $f_1/f$ is not smaller than the upper limit, it becomes difficult to suppress the astigmatism and when the ratio $f_1/f$ is not larger than the lower limit, it becomes difficult to satisfactorily correct the coma.

The formula (2) is for the power of the fourth lens element which determines the ratio $f_4/f$ of the focal length $f_4$ of the fourth lens element to the synthetic focal length f of the overall lens system. When the ratio $f_4/f$ is not smaller than the upper limit, it becomes difficult to suppress the astigmatism and when the ratio $f_4/f$ is not larger than the lower limit, it becomes difficult to satisfactorily correct the coma.

That is, when the formula (2) is satisfied, the lens system can be excellent in both the astigmatism and the coma.

The formula (3) limits the central thickness of the fourth lens element. When the central thickness of the fourth lens element is not smaller the upper limit, the astigmatism becomes too large and at the same time, the fourth lens becomes difficult to manufacture. When the central thickness of the fourth lens element is not larger the lower limit, curvature of field becomes too large.

That is, when the formula (3) is satisfied, the lens system can be excellent in both the astigmatism and the curvature of field and at the same time can be easily manufactured at low cost.

The formula (4) limits the length d of the overall lens system. When the length d is not smaller than the upper limit, the size of the lens system becomes too large and the object of reducing the size of an imagery lens system for an image reading system cannot be accomplished, and when the length d is not larger than the lower limit, assembly of the lens system becomes difficult due to the condition of mechanical parts such as lens barrels.

That is, when the formula (4) is satisfied, the lens system can be small in size and assembly of the lens system is facilitated.

Though in the conventional image reading imagery lens systems consisting of four lens elements, a stop is disposed between the second and third lens elements, the coma and the distortion can be corrected in a good balance in a reducing or magnifying lens system when the stop is disposed between the third and fourth lens elements as in the present invention.

DESCRIPTION OF THE PREFERRED EMBODIMENTS

Figure 1:
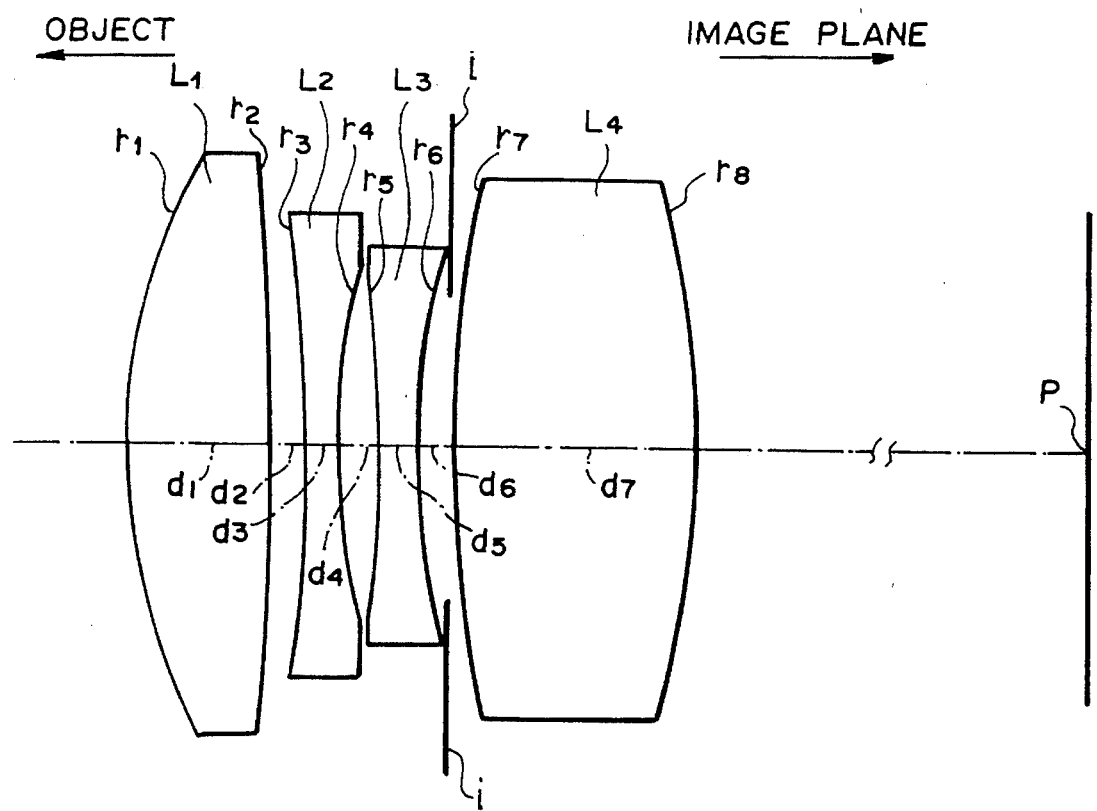
FIG. 1 is a cross-sectional view showing the basic structure of lens systems in accordance with first to seventh embodiments of the present invention, FIGS. 2A to 2C respectively show spherical aberration, astigmatism and distortion of the lens system in accordance with the first embodiment of the present invention, FIGS. 3A to 3C respectively show spherical aberration, astigmatism and distortion of the lens system in accordance with the second embodiment of the present invention, FIGS. 4A to 4C respectively show spherical aberration, astigmatism and distortion of the lens system in accordance with the third embodiment of the present invention, FIGS. 5A to 5C respectively show spherical aberration, astigmatism and distortion of the lens system in accordance with the fourth embodiment of the present invention, FIGS. 6A to 6C respectively show spherical aberration, astigmatism and distortion of the lens system in accordance with the fifth embodiment of the present invention, FIGS. 7A to 7C respectively show spherical aberration, astigmatism and distortion of the lens system in accordance with the sixth embodiment of the present invention, and FIGS. 8A to 8C respectively show spherical aberration, astigmatism and distortion of the lens system in accordance with the seventh embodiment of the present invention.
Figure 4A:
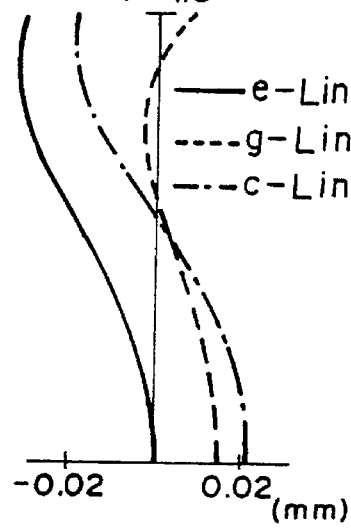
Figure 4B:
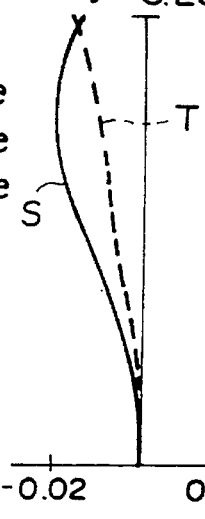
Figure 4C:
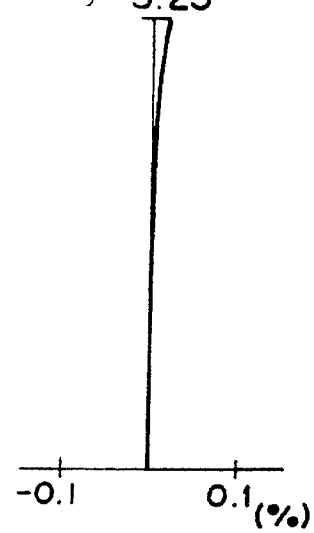
Figure 5A:
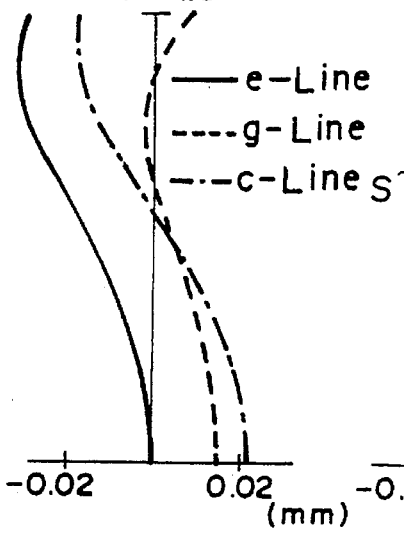
Figure 5B:
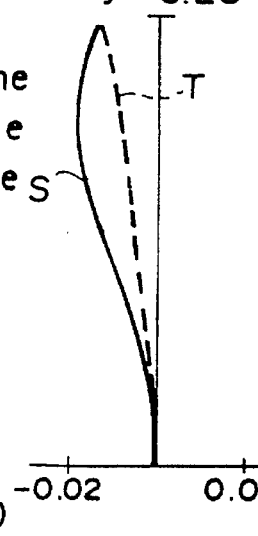
Figure 5C:
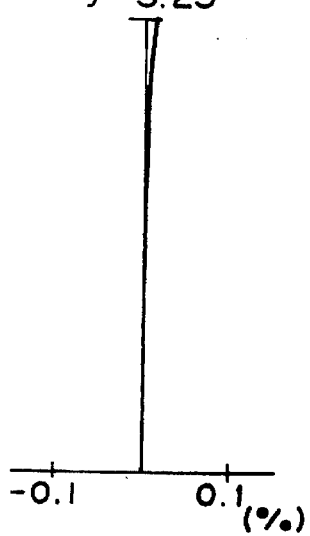
Figure 6A:
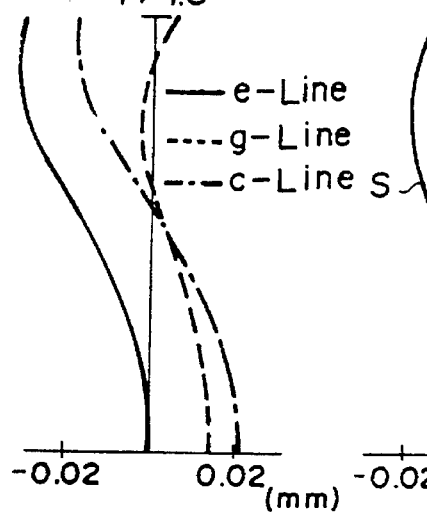
Figure 6B:
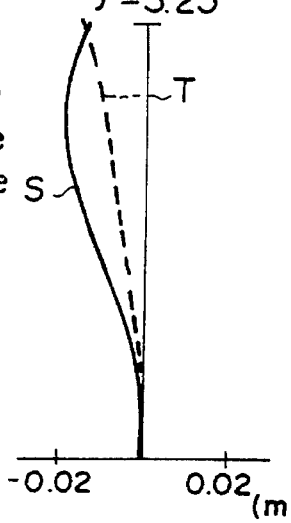
Figure 6C:
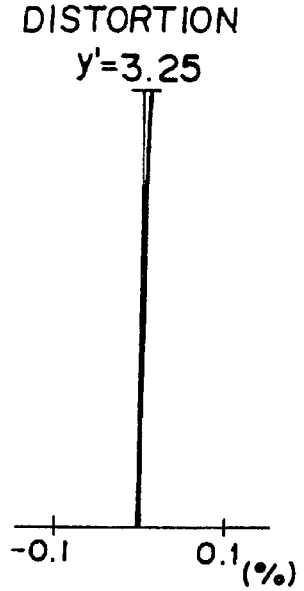
Figure 7A:
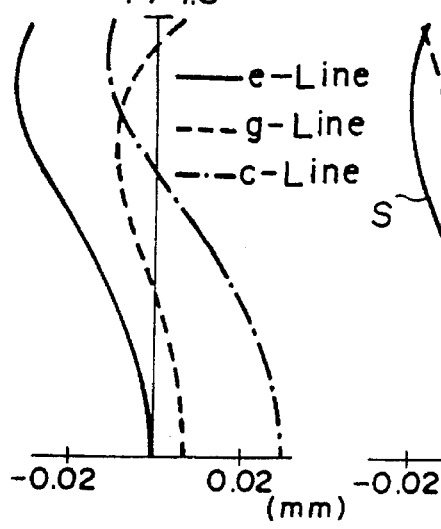
Figure 7B:
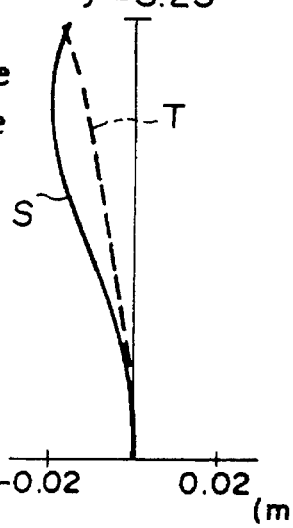
Figure 7C:
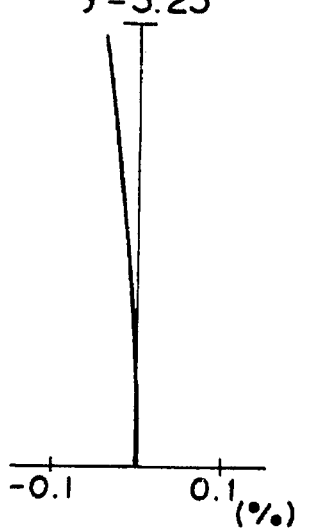

Imagery lens systems for image reading in accordance with first to seventh embodiments of the present invention will be described, hereinbelow. As shown in FIG. 1, each of the first to seventh embodiments consists of first to fourth lens elements L1 to L4 and a stop i is disposed between the third lens element L3 and the fourth lens element L4. A light bundle which enters the lens system from an object along its optical axis is focused on an image point P.

The first lens element L1 is a double-convex lens having the face of greater curvature faced to the object, the second lens element L2 is a double-concave lens having the face of greater curvature faced to the image plane, the third lens element L3 is a double-concave lens having the face of greater curvature faced to the image plane, and the fourth lens element L4 is a double-convex lens having the face of greater curvature faced to the image plane.

These lens elements satisfy the following formulae, $0.35 < f1/f < 0.51$ —(1)

$0.34 < f4/f < 0.45$ —(2)

$0.11 < d7/f < 0.16$ —(3)

$0.29 < d/f < 0.41$ —(4)

wherein f represents the synthetic focal length of the overall lens system, f1 represents the focal length of the first lens element L1, f4 represents the focal length of the fourth lens element L4, d represents the axial surface separation between the object side face of the first lens element L1 and the image side face of the fourth lens element L4 and d7 represents the central thicknesses of the fourth lens element L4.

When the formula (1) is satisfied, the lens system can be good in both the astigmatism and the coma. When the formula (2) is satisfied, the lens system can be excellent in both the astigmatism and the coma. When the formula (3) is satisfied, the lens system can be excellent in both the astigmatism and the curvature of field and at the same time can be easily manufactured at low cost. When the formula (4) is satisfied, the lens system can be small in size and assembly of the lens system is facilitated. When the stop i is disposed between the third and fourth lens elements L3 and L4, the coma and the distortion can be corrected in a good balance in a reducing or magnifying lens system.

In the particular first to seventh embodiments of the present invention, the following formulae (5) to (10) are further satisfied.

$0.29 < r1/f < 0.45$ —(5)

$0.31 < r6/f < 0.49$ —(6)

$1.75 < n4$ —(7)

$0.48 < r6/r7 < 0.66$ —(8)

$0.017 < d4/f < 0.023$ —(9)

$0.017 < d6/f < 0.025$ —(10)

wherein r1 represents the radius of curvature of the object side face of the first lens element L1, r6 represents the radius of curvature of the image side face of the third lens element L3, r7 represents the radius of curvature of the object side face of the fourth lens element L4, n4 represents the refractive index of the fourth lens element L4, d4 represents the axial surface separation between the image side face of the second lens element L2 and the object side face of the third lens element L3, and d6 represents the axial surface separation between the image side face of the third lens element L3 and the object side face of the fourth lens element L4.

When the ratio r1/f is not smaller than the upper limit in the formula (5), it becomes difficult to satisfactorily correct the coma and when the ratio r1/f is not larger than the lower limit, the astigmatism becomes large. That is, when the formula (5) is satisfied, the lens system can be excellent in both the astigmatism and the coma.

When the radius of curvature r6 of the image side face of the third lens element L3 is not smaller than the upper limit in the formula (6), the spherical aberration cannot be satisfactorily corrected and when the radius of curvature r6 is not larger than the lower limit, the spherical aberration is excessively corrected and the coma becomes large. That is, when the formula (6) is satisfied, the lens system can be excellent in both the spherical aberration and the coma.

When the glass material of the fourth lens element L4 has a refractive index not higher than the lower limit in the formula (7), the Petzval sum becomes too large to suppress the astigmatism. When the formula (7) is satisfied, the astigmatism can be easily reduced.

When the ratio r6/r7 of the radius of curvature r6 of the image side face of the third lens element L3 to the radius of curvature r7 of the object side face of the fourth lens element L4 is not smaller than the upper limit or not larger than the lower limit in the formula (8), it becomes difficult to correct the spherical aberration and the astigmatism in a good balance. That is, when the formula (8) is satisfied, the spherical aberration and the astigmatism can be easily corrected in a good balance.

When the ratio d4/f of the axial surface separation r4 between the image side face of the second lens element L2 and the object side face of the third lens element L3 to the synthetic focal length f of the overall lens system is not smaller than the upper limit in the formula (9) or when the ratio d6/f of the axial surface separation r6 between the image side face of the third lens element L3 and the object side face of the fourth lens element L4 to the synthetic focal length f of the overall lens system is not smaller than the upper limit in the formula (10), it becomes difficult to satisfactorily correct the coma and the astigmatism. When the ratio d4/f is not larger than the lower limit in the formula (9) or when the ratio d6/f is not larger than the lower limit in the formula (10), assembly of the lens system becomes difficult due to the condition of mechanical parts such as lens barrels. That is, when the formulae (9) and (10) are satisfied, the lens system can be excellent in both the astigmatism and the coma, and assembly of the lens system is facilitated.

The first to seventh embodiments of the present invention will be described in more detail, hereinbelow.

In all the first to seventh embodiments, the synthetic focal length f and the magnification $\beta$ of the overall lens system is 10 mm and −0.126, respectively, and the F number and the half field angle are 4.8 and 16.3°, respectively.

EMBODIMENT 1

The radii of curvature r (mm) of the refracting surfaces, the axial surface separations d (mm) (the central thicknesses of the lens elements or the air separations), and the refractive indexes $n_d$ and the Abbe's numbers $v_d$ of the lens elements for the sodium d-line in the imagery lens system of the first embodiment are shown in table 1. The numbers in the leftmost column of table 1 designate the numbers of the symbols r, d, $n_d$ and $v_d$ as numbered from the object side. (the same for all the tables in this specification)

TABLE 1

| | r | d | $n_d$ | $v_d$ |
|---|---|---|---|---|
| 1 | 3.8905 | 0.9051 | 1.72250 | 49.6 |
| 2 | −41.1837 | 0.3494 | | |
| 3 | −8.3806 | 0.2548 | 1.64769 | 33.9 |
| 4 | 5.1568 | 0.1917 | | |
| 5 | −8.4793 | 0.2596 | 1.61293 | 36.9 |
| 6 | 4.2569 | 0.2257 | | |
| 7 | 7.2747 | 1.2546 | 1.77250 | 49.6 |
| 8 | −4.8949 | | | | f1/f = 0.46422
f4/f = 0.39660
r1/f = 0.38905
r6/f = 0.42569
d7/f = 0.12546
r6/r7 = 0.58517
d/f = 0.34407
d4/f = 0.01917
d6/f = 0.02257

EMBODIMENT 2

The radii of curvature r (mm) of the refracting surfaces, the axial surface separations d (mm) (the central thicknesses of the lens elements or the air separations), and the refractive indexes $n_d$ and the Abbe's numbers $v_d$ of the lens elements for the sodium d-line in the imagery lens system of the second embodiment are shown in table 2.

TABLE 2

| | r | d | $n_d$ | $v_d$ |
|---|---|---|---|---|
| 1 | 3.9528 | 0.8129 | 1.77250 | 49.6 |
| 2 | −30.6199 | 0.3689 | | |
| 3 | −7.8259 | 0.2621 | 1.61293 | 36.9 |
| 4 | 5.6192 | 0.1941 | | |
| 5 | −8.6329 | 0.2402 | 1.64769 | 33.9 |
| 6 | 4.4089 | 0.2184 | | |
| 7 | 7.6242 | 1.4415 | 1.77250 | 49.6 |
| 8 | −4.8499 | | | | f1/f = 0.45788
f4/f = 0.40407
r1/f = 0.39528
r6/f = 0.44089
d7/f = 0.14415
r6/r7 = 0.57828
d/f = 0.35381
d4/f = 0.01941
d6/f = 0.02184

EMBODIMENT 3

The radii of curvature r (mm) of the refracting surfaces, the axial surface separations d (mm) (the central thicknesses of the lens elements or the air separations), and the refractive indexes $n_d$ and the Abbe's numbers $v_d$ of the lens elements for the sodium d-line in the imagery lens system of the third embodiment are shown in table 3.

TABLE 3

| | r | d | $n_d$ | $v_d$ |
|---|---|---|---|---|
| 1 | 3.9526 | 0.8025 | 1.77250 | 49.6 |
| 2 | −31.6014 | 0.3761 | | |
| 3 | −7.7807 | 0.2669 | 1.61293 | 36.9 |
| 4 | 5.1241 | 0.1893 | | |
| 5 | −8.6922 | 0.2427 | 1.64769 | 33.9 |
| 6 | 4.4087 | 0.2184 | | |
| 7 | 7.5426 | 1.4365 | 1.77250 | 49.6 |
| 8 | −4.8380 | | | | f1/f = 0.45930
f4/f = 0.40187
r1/f = 0.39526
r6/f = 0.44087
d7/f = 0.14365
r6/r7 = 0.58451
d/f = 0.35324
d4/f = 0.01893
d6/f = 0.02184

EMBODIMENT 4

The radii of curvature r (mm) of the refracting surfaces, the axial surface separations d (mm) (the central thicknesses of the lens elements or the air separations), and the refractive indexes $n_d$ and the Abbe's numbers $v_d$ of the lens elements for the sodium d-line in the imagery lens system of the fourth embodiment are shown in table 4.

TABLE 4

| | r | d | $n_d$ | $v_d$ |
|---|---|---|---|---|
| 1 | 4.0378 | 0.8570 | 1.77250 | 49.6 |
| 2 | −21.2397 | 0.2913 | | |
| 3 | −7.9181 | 0.3666 | 1.60342 | 38.0 |
| 4 | 5.3206 | 0.1942 | | |
| 5 | −7.2449 | 0.2476 | 1.64769 | 33.9 |
| 6 | 4.4106 | 0.2185 | | |
| 7 | 7.7948 | 1.3425 | 1.77250 | 49.6 |
| 8 | −4.7650 | | | | f1/f = 0.44579
f4/f = 0.40152
r1/f = 0.40378
r6/f = 0.44106
d7/f = 0.13425
r6/r7 = 0.56584
d/f = 0.35177
d4/f = 0.01942
d6/f = 0.02185

EMBODIMENT 5

The radii of curvature r (mm) of the refracting surfaces, the axial surface separations d (mm) (the central thicknesses of the lens elements or the air separations), and the refractive indexes $n_d$ and the Abbe's numbers $v_d$ of the lens elements for the sodium d-line in the imagery lens system of the fifth embodiment are shown in table 5.

TABLE 5

| | r | d | $n_d$ | $v_d$ |
|---|---|---|---|---|
| 1 | 4.0915 | 1.1296 | 1.77250 | 49.6 |
| 2 | −18.9252 | 0.2429 | | |
| 3 | −8.0252 | 0.2551 | 1.60342 | 38.0 |
| 4 | 5.4765 | 0.1992 | | |
| 5 | −7.0022 | 0.2429 | 1.64769 | 33.9 |
| 6 | 4.3252 | 0.2186 | | |
| 7 | 7.6230 | 1.4017 | 1.77250 | 49.6 |
| 8 | −4.8432 | | | | f1/f = 0.44502
f4/f = 0.40313
r1/f = 0.40915
r6/f = 0.43252
d7/f = 0.14017
r6/r7 = 0.56379
d/f = 0.36900
d4/f = 0.01992
d6/f = 0.02186

EMBODIMENT 6

The radii of curvature r (mm) of the refracting surfaces, the axial surface separations d (mm) (the central thicknesses of the lens elements or the air separations), and the refractive indexes $n_d$ and the Abbe's numbers $v_d$ of the lens elements for the sodium d-line in the imagery lens system of the sixth embodiment are shown in table 6.

TABLE 6

| | r | d | $n_d$ | $v_d$ |
|---|---|---|---|---|
| 1 | 3.7865 | 0.7808 | 1.77250 | 49.6 |
| 2 | −21.2008 | 0.2432 | | |
| 3 | −8.9223 | 0.2627 | 1.51454 | 54.6 |
| 4 | 4.8780 | 0.2119 | | |
| 5 | −6.8486 | 0.2457 | 1.74077 | 27.7 |
| 6 | 4.3115 | 0.2189 | | |
| 7 | 8.0115 | 1.4084 | 1.78500 | 43.7 |
| 8 | −4.7646 | | | |

TABLE 6-continued f1/f = 0.42162
f4/f = 0.39999
r1/f = 0.37865
r6/f = 0.43115
d7/f = 0.14084
r6/r7 = 0.53816
d/f = 0.33716
d4/f = 0.02119
d6/f = 0.02189

EMBODIMENT 7

The radii of curvature r (mm) of the refracting surfaces, the axial surface separations d (mm) (the central thicknesses of the lens elements or the air separations), and the refractive indexes $n_d$ and the Abbe's numbers $v_d$ of the lens elements for the sodium d-line in the imagery lens system of the seventh embodiment are shown in table 7.

TABLE 7

| | r | d | $n_d$ | $v_d$ |
|---|---|---|---|---|
| 1 | 3.2494 | 0.8312 | 1.76883 | 50.8 |
| 2 | −39.4459 | 0.1622 | | |
| 3 | −14.3268 | 0.2425 | 1.58700 | 50.7 |
| 4 | 4.1540 | 0.1939 | | |
| 5 | −8.7490 | 0.2424 | 1.74013 | 29.2 |
| 6 | 3.4990 | 0.1939 | | |
| 7 | 5.8202 | 1.4550 | 1.79999 | 43.7 |
| 8 | −5.6145 | | | | f1/f = 0.39406
f4/f = 0.37864
r1/f = 0.32494
r6/f = 0.34990
d7/f = 0.14550
r6/r7 = 0.60118
d/f = 0.33211
d4/f = 0.01939
d6/f = 0.01939

Spherical aberration, astigmatism and distortion of the lens system of the first to seventh embodiments of the present invention are respectively shown in FIGS. 2A, 2B and 2C to FIGS. 8A, 8B and 8C. In the drawings, y' represents the height of image.

As can be understood from FIGS. 2A, 2B and 2C to FIGS. 8A, 8B and 8C, the lens systems of the first to seventh embodiments are excellent in the aberrations.

The structure of the imagery lens system in accordance with the present invention need not be limited to those described above in conjunction with the first to seventh embodiments, but, for instance, the radius of curvature of each lens element, the axial surface separations (the central thicknesses of the lens elements or the air separations) d, and the like may be variously modified without departing from the spirit and scope of the invention.

What is claimed is:

1. An imagery lens system consisting of first to fourth lens elements which are arranged in this order from the object side, the first and fourth lens elements respectively being double-convex lenses, the second and third lens elements respectively being double-concave lenses, wherein the following formulae are satisfied, $$0.35 < f1/f < 0.51 \quad (1)$$

$$0.34 < f4/f < 0.45 \quad (2)$$

$$0.11 < d7/f < 0.16 \quad (3)$$

$$0.29 < d/f < 0.41 \quad (4)$$

wherein f represents the synthetic focal length of the overall lens system, f1 represents the focal length of the first lens element, f4 represents the focal length of the fourth lens element, d represents the axial surface separation between the object side face of the first lens element and the image side face of the fourth lens element and d7 represents the central thicknesses of the fourth lens element.

2. An imagery lens system as defined in claim 1 in which a stop is disposed between the third and fourth lens elements.

3. An imagery lens system as defined in claim 2 wherein the following formulae are further satisfied, $$0.29 < r1/f < 0.45 \quad (5)$$

$$0.31 < r6/f < 0.49 \quad (6)$$

$$1.75 < n4 \quad (7)$$

$$0.48 < r6/r7 < 0.66 \quad (8)$$

$$0.017 < d4/f < 0.023 \quad (9)$$

$$0.017 < d6/f < 0.025 \quad (10)$$

wherein r1 represents the radius of curvature of the object side face of the first lens element L1, r6 represents the radius of curvature of the image side face of the third lens element L3, r7 represents the radius of curvature of the object side face of the fourth lens element L4, n4 represents the refractive index of the fourth lens element L4, d4 represents the axial surface separation between the image side face of the second lens element L2 and the object side face of the third lens element L3, and d6 represents the axial surface separation between the image side face of the third lens element L3 and the object side face of the fourth lens element L4.

4. An imagery lens system as defined in claim 3 wherein the following conditions are satisfied,

| r1 = 3.8905   | d1 = 0.9051 | n1 = 1.72250 | $v_1$ = 49.6 |
| r2 = −41.1837 | d2 = 0.3494 |              |              |
| r3 = −8.3806  | d3 = 0.2548 | n2 = 1.64769 | $v_2$ = 33.9 |
| r4 = 5.1568   | d4 = 0.1917 |              |              |
| r5 = −8.4793  | d5 = 0.2596 | n3 = 1.61293 | $v_3$ = 36.9 |
| r6 = 4.2569   | d6 = 0.2257 |              |              |
| r7 = 7.2747   | d7 = 1.2546 | n4 = 1.77250 | $v_4$ = 49.6 |
| r8 = −4.8949  |             |              |              |

| f1/f = 0.46422 |
| f4/f = 0.39660 |
| r1/f = 0.38905 |
| r6/f = 0.42569 |
| d7/f = 0.12546 |
| r6/r7 = 0.58517 |
| d/f = 0.34407 |
| d4/f = 0.01917 |
| d6/f = 0.02257 | where the radii of curvature of the refracting surfaces, the axial surface separations, the refractive indexes for the sodium d-line and the Abbe's numbers of the lenses $L_1$ to $L_4$ are designated in order from the object side at r1 to r8, d1 to d7, n1 to n4 and $v_1$ to $v_4$.

5. An imagery lens system as defined in claim 3 wherein the following conditions are satisfied,

| r1 = 3.9528   | d1 = 0.8129 | n1 = 1.77250 | $v_1$ = 49.6 |
| r2 = −30.6199 | d2 = 0.3689 |              |              |
| r3 = −7.8259  | d3 = 0.2621 | n2 = 1.61293 | $v_2$ = 36.9 |
| r4 = 5.6192   | d4 = 0.1941 |              |              |
| r5 = −8.6329  | d5 = 0.2402 | n3 = 1.64769 | $v_3$ = 33.9 |
| r6 = 4.4089   | d6 = 0.2184 |              |              |
| r7 = 7.6242   | d7 = 1.4415 | n4 = 1.77250 | $v_4$ = 49.6 |
| r8 = −4.8499  |             |              |              |

| f1/f = 0.45788 |
| f4/f = 0.40407 |
| r1/f = 0.39528 |
| r6/f = 0.44089 |
| d7/f = 0.14415 |
| r6/r7 = 0.57828 |
| d/f = 0.35381 |
| d4/f = 0.01941 |
| d6/f = 0.02184 | where the radii of curvature of the refracting surfaces, the axial surface separations, the refractive indexes for the sodium d-line and the Abbe's numbers of the lenses $L_1$ to $L_4$ are designated in order from the object side at r1 to r8, d1 to d7, n1 to n4 and $v_1$ to $v_4$.

6. An imagery lens system as defined in claim 3 wherein the following conditions are satisfied,

| r1 = 3.9526   | d1 = 0.8025 | n1 = 1.77250 | $v_1$ = 49.6 |
| r2 = −31.6014 | d2 = 0.3761 |              |              |
| r3 = −7.7807  | d3 = 0.2669 | n2 = 1.61293 | $v_2$ = 36.9 |
| r4 = 5.1241   | d4 = 0.1893 |              |              |
| r5 = −8.6922  | d5 = 0.2427 | n3 = 1.64769 | $v_3$ = 33.9 |
| r6 = 4.4087   | d6 = 0.2184 |              |              |
| r7 = 7.5426   | d7 = 1.4365 | n4 = 1.77250 | $v_4$ = 49.6 |
| r8 = −4.8380  |             |              |              |

| f1/f = 0.45930 |
| f4/f = 0.40187 |
| r1/f = 0.39526 |
| r6/f = 0.44087 |
| d7/f = 0.14365 |
| r6/r7 = 0.58451 |
| d/f = 0.35324 |
| d4/f = 0.01893 |
| d6/f = 0.02184 | where the radii of curvature of the refracting surfaces, the axial surface separations, the refractive indexes for the sodium d-line and the Abbe's numbers of the lenses $L_1$ to $L_4$ are designated in order from the object side at r1 to r8, d1 to d7, n1 to n4 and $v_1$ to $v_4$.

7. An imagery lens system as defined in claim 3 wherein the following conditions are satisfied,

| r1 = 4.0378   | d1 = 0.8570 | n1 = 1.77250 | $v_1$ = 49.6 |
| r2 = −21.2397 | d2 = 0.2913 |              |              |
| r3 = −7.9181  | d3 = 0.3666 | n2 = 1.60342 | $v_2$ = 38.0 |
| r4 = 5.3206   | d4 = 0.1942 |              |              |
| r5 = −7.2449  | d5 = 0.2476 | n3 = 1.64769 | $v_3$ = 33.9 |
| r6 = 4.4106   | d6 = 0.2185 |              |              |
| r7 = 7.7948   | d7 = 1.3425 | n4 = 1.77250 | $v_4$ = 49.6 |
| r8 = −4.7650  |             |              |              |

| f1/f = 0.44579 |
| f4/f = 0.40152 |
| r1/f = 0.40378 |
| r6/f = 0.44106 |
| d7/f = 0.13425 |
| r6/r7 = 0.56584 |
| d/f = 0.35177 |
| d4/f = 0.01942 |
| d6/f = 0.02185 | where the radii of curvature of the refracting surfaces, the axial surface separations, the refractive indexes for the sodium d-line and the Abbe's numbers of the lenses $L_1$ to $L_4$ are designated in order from the object side at r1 to r8, d1 to d7, n1 to n4 and $v_1$ to $v_4$.

8. An imagery lens system as defined in claim 3 wherein the following conditions are satisfied,

| | | | |
|---|---|---|---|
| r1 = 4.0915 | d1 = 1.1296 | n1 = 1.77250 | $v_1$ = 9.6 |
| r2 = −18.9252 | d2 = 0.2429 | | |
| r3 = −8.0252 | d3 = 0.2551 | n2 = 1.60342 | $v_2$ = 38.0 |
| r4 = 5.4765 | d4 = 0.1992 | | |
| r5 = −7.0022 | d5 = 0.2429 | n3 = 1.64769 | $v_3$ = 33.9 |
| r6 = 4.3252 | d6 = 0.2186 | | |
| r7 = 7.6230 | d7 = 1.4017 | n4 = 1.77250 | $v_4$ = 49.6 |
| r8 = −4.8432 | | | | f1/f = 0.44502
f4/f = 0.40313
r1/f = 0.40915
r6/f = 0.43252
d7/f = 0.14017
r6/r7 = 0.56379
d/f = 0.36900
d4/f = 0.01992
d6/f = 0.02186 where the radii of curvature of the refracting surfaces, the axial surface separations, the refractive indexes for the sodium d-line and the Abbe's numbers of the lenses $L_1$ to $L_4$ are designated in order from the object side at r1 to r8, d1 to d7, n1 to n4 and $v_1$ to $v_4$.

9. An imagery lens system as defined in claim 3 wherein the following conditions are satisfied,

| | | | |
|---|---|---|---|
| r1 = 3.7865 | d1 = 0.7808 | n1 = 1.77250 | $v_1$ = 49.6 |
| r2 = −21.2008 | d2 = 0.2432 | | |
| r3 = −8.9223 | d3 = 0.2627 | n2 = 1.51454 | $v_2$ = 54.6 |
| r4 = 4.8780 | d4 = 0.2119 | | |
| r5 = −6.8486 | d5 = 0.2457 | n3 = 1.74077 | $v_3$ = 27.7 |
| r6 = 4.3115 | d6 = 0.2189 | | |
| r7 = 8.0115 | d7 = 1.4084 | n4 = 1.78500 | $v_4$ = 43.7 |
| r8 = −4.7646 | | | | f1/f = 0.42162 f4/f = 0.39999
r1/f = 0.37865
r6/f = 0.43115
d7/f = 0.14084
r6/r7 = 0.53816
d/f = 0.33716
d4/f = 0.02119
d6/f = 0.02189 where the radii of curvature of the refracting surfaces, the axial surface separations, the refractive indexes for the sodium d-line and the Abbe's numbers of the lenses $L_1$ to $L_4$ are designated in order from the object side at r1 to r8, d1 to d7, n1 to n4 and $v_1$ to $v_4$.

10. An imagery lens system as defined in claim 3 wherein the following conditions are satisfied,

| | | | |
|---|---|---|---|
| r1 = 3.2494 | d1 = 0.8312 | n1 = 1.76883 | $v_1$ = 50.8 |
| r2 = −39.4459 | d2 = 0.1622 | | |
| r3 = −14.3268 | d3 = 0.2425 | n2 = 1.58700 | $v_2$ = 50.7 |
| r4 = 4.1540 | d4 = 0.1939 | | |
| r5 = −8.7490 | d5 = 0.2424 | n3 = 1.74013 | $v_3$ = 29.2 |
| r6 = 3.4990 | d6 = 0.1939 | | |
| r7 = 5.8202 | d7 = 1.4550 | n4 = 1.79999 | $v_4$ = 43.7 |
| r8 = −5.6145 | | | | f1/f = 0.39406
f4/f = 0.37864
r1/f = 0.32494
r6/f = 0.34990
d7/f = 0.14550
r6/r7 = 0.60118
d/f = 0.33211
d4/f = 0.01939
d6/f = 0.01939 where the radii of curvature of the refracting surfaces, the axial surface separations, the refractive indexes for the sodium d-line and the Abbe's numbers of the lenses $L_1$ to $L_4$ are designated in order from the object side at r1 to r8, d1 to d7, n1 to n4 and $v_1$ to $v_4$.

* * * * *